May 17, 1955  C. S. MERTLER  2,708,398
AUTOMATIC COFFEE MAKER
Filed Aug. 31, 1949  3 Sheets-Sheet 3

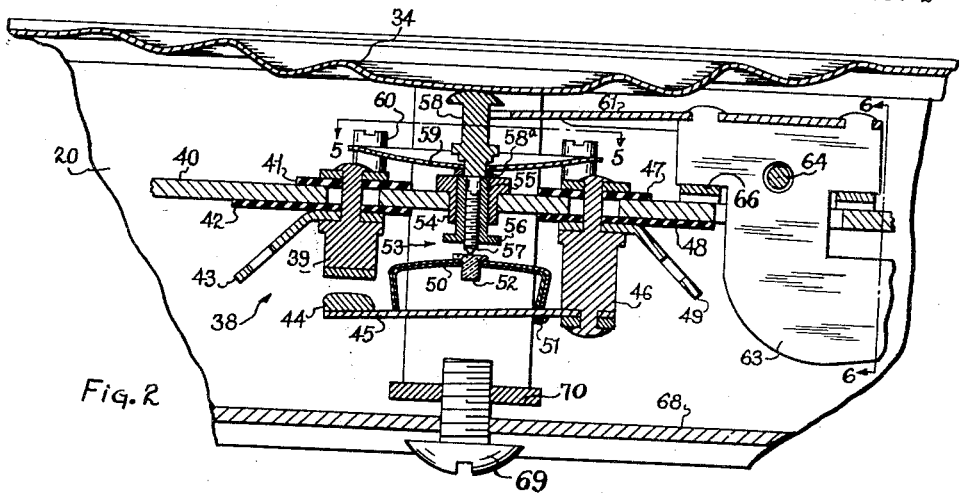
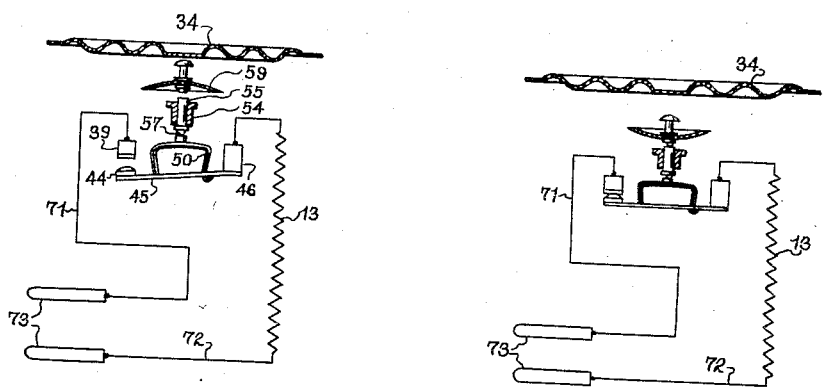
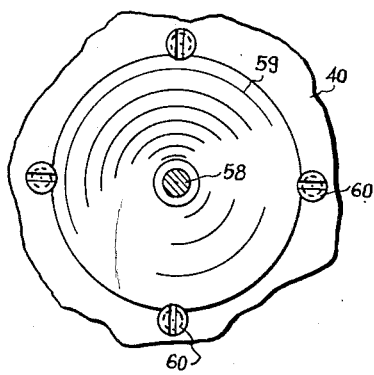
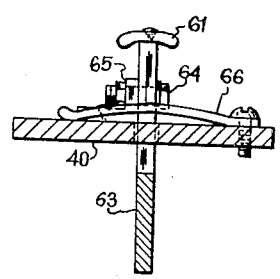

INVENTOR.
CHARLES S. MERTLER
BY Hudson, Boughton,
Williams, David & Hoffmann
ATTORNEYS United States Patent Office 2,708,398
Patented May 17, 1955

2,708,398

AUTOMATIC COFFEE MAKER

Charles S. Mertler, Mansfield, Ohio, assignor to Stevens Manufacturing Company, Inc., Lexington, Ohio, a corporation of Ohio Application August 31, 1949, Serial No. 113,393

6 Claims. (Cl. 99—281)

This invention relates to automatic coffee makers and, more particularly, to automatic coffee makers of the vacuum type wherein water is heated in a lower vessel, or pot, until sufficient vapor pressure is developed therein to cause transfer of the heated water to an upper vessel, or bowl, containing ground coffee beans, the water together with the substance extracted from the coffee beans returning to the lower vessel when the latter has cooled sufficiently to reduce the vapor pressure therein.

Coffee maker manufacturers, as well as many coffee consumers, have long recognized that probably the most important factor in making good coffee is accurate control of the duration of the coffee brewing period, the brewing period being defined as the time interval in which suitably heated water is in contact with the ground coffee beans. In conventional automatic coffee makers of the type mentioned above, an electric heating element is commonly employed for heating the water in the lower vessel or pot of the maker, thermally responsive switch means being connected to the element for terminating the heating period when the water is transferred to the upper vessel or bowl by the steam generated in the lower vessel. Such devices depend for operation on the fact that there is a rapid rise in the temperature of the pot when the majority of the water is transferred therefrom, which rise in temperature operates the thermally responsive switch terminating the heating period. Therefore, since the liquid automatically returns from the bowl to the pot when the latter has cooled sufficiently to reduce the vapor pressure therein, the principal control over the length of the brewing period is effected by the aforementioned thermally responsive switch.

Unfortunately, however, coffee makers operating in this manner are subject to undesirable variations in the brewing period due to variations in the length of interval between the time the water is forced into the upper vessel or bowl and the time the heating element is turned off. For example, fluctuations in voltage of the electric power supply, variations in the initial temperature of the water used, low boiling point of water at high altitudes, and numerous other conditions vary the interval between the time the water is transferred to the upper vessel and the time when the lower vessel or pot becomes hot enough to operate the thermally responsive switch turning off the heating element. These variations in the brewing period of conventional coffee makers as the result of conditions of the type mentioned are inherent and cannot be readily compensated, since the control of the heating element depends upon a secondary effect, namely the rapid rise in temperature of the lower vessel or pot when the water has been transferred therefrom, rather than upon an effect directly productive of the transfer of the water.

An object of this invention is to provide a coffee maker of the vacuum type with a novel control means which is fully automatic and requires no attention, after connection to a source of electrical energy, and which will produce uniformly good coffee at each use thereof regardless of the initial temperature or quantity of water used, atmospheric pressure, variations in voltage of the electrical energy supplied to the heater of the coffee maker, or similar variables.

Another object of the invention is to provide a coffee maker of the type defined above which has a novel control means for the heater thereof which control means is so arranged that it renders the heater effective to produce a high heat until just prior to the completion of the water elevation cycle of the maker and thereafter operates the heater in a manner maintaining the brewed coffee at a satisfactory serving temperature after the brewed coffee enters the lower vessel or pot.

A further object of this invention is to provide an automatic coffee maker of the type mentioned above with automatic control means which is so constructed that the supply of energy to the heating means is interrupted during the transfer of water to the upper vessel or bowl under control of the vapor pressure generated in the lower vessel or pot of the coffee maker.

An additional object of the invention is to provide an improved coffee maker of the type defined in the preceding paragraph and in which the control means includes a means to protect the coffee maker from damage by overheating in the event it is inadvertently connected for operation with no water therein.

In its broader aspects, the invention resides in a novel apparatus comprising two intercommunicating chambers, one of which is adapted to receive a liquid for heating with the liquid being transferred to the other chamber by the vapor pressure generated in the first chamber, a means responsive to the vapor pressure generated in the first chamber being provided for governing operation of the means for heating the liquid.

The invention further resides in certain novel features of construction and combination and arrangements of parts, and further objects and advantages thereof will be apparent to those skilled in the art to which it pertains from the following description of the present preferred embodiment, and certain modifications thereof, described with reference to the accompanying drawings in which similar reference characters represent corresponding parts in the several views and in which:

Fig. 2 is an enlarged, fragmentary view of the lower portion of Fig. 1 more clearly illustrating the novel control means, the latter being shown in the position to which it is operated during the water elevation portion of the coffee making cycle;

Fig. 3 is a schematic diagram of the control means illustrated in Figs. 1 and 2 showing the positions of the parts thereof when the liquid has returned to the lower vessel or pot after the brewing period and while the brewed coffee is being heated to maintain it at a serving temperature;

Fig. 4 is a schematic diagram of the control means shown in Figs. 1 and 2, illustrating the positions of the parts thereof when the heating means is energized with no liquid in the pot;

Fig. 5 is a fragmentary sectional view taken substantially on the line 5—5 of Fig. 2;

Fig. 6 is a fragmentary sectional view taken substantially on the line 6—6 of Fig. 2;

For the sake of clarity and definiteness of disclosure, this invention will be described and illustrated only as embodied in coffee makers of the vacuum type. It is to be understood, however, that the invention is not necessarily limited to such coffee makers but is applicable to any apparatus comprising a plurality of chambers in communication with each other, one of which is adapted to receive a liquid to be heated, which liquid is then transferred to another chamber by the vapor pressure generated in the first chamber, and wherein it is desired to terminate the heating upon such transfer of the liquid. The present preferred embodiment of the invention and the modifications thereof which have been selected for description and illustration, are therefore simply representative of the invention.

Figure 1:
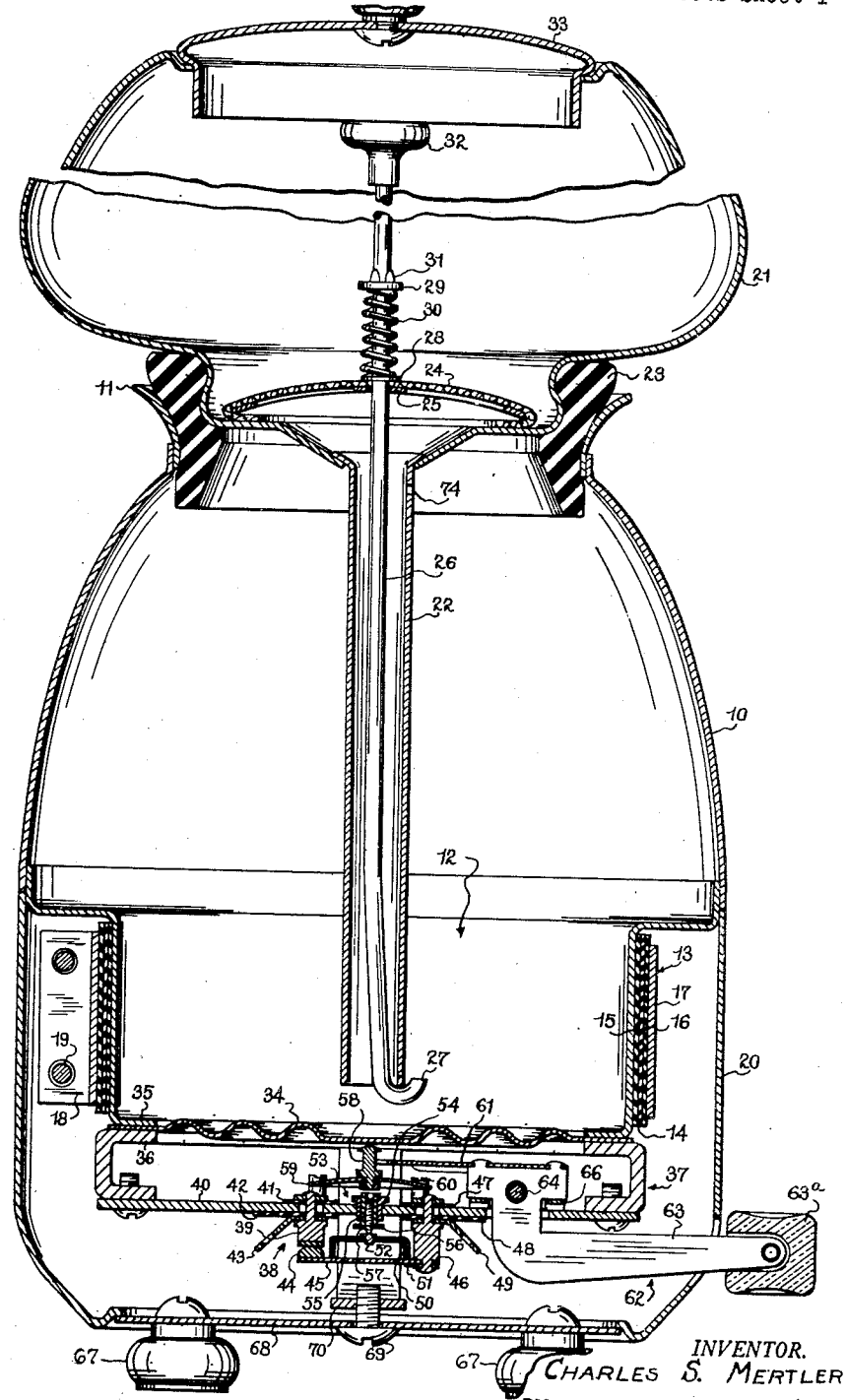
Fig. 1 is a vertical section through the present preferred form of a coffee maker embodying the invention with a portion of the upper vessel or bowl being broken away, the view being taken at substantially right angles to the plug terminal and handle assemblies with the control means being shown in the non-operated position corresponding with the cold condition of the pot.

Referring now to the drawings, and in particular to Figs. 1 and 2, the present preferred form of the coffee maker comprises a lower vessel or pot 10 preferably formed of metal and having its upper portion provided with an opening, the edge of which is preferably formed as a pouring rim or spout 11. In the illustrated form of the pot, the bottom thereof has a well 12 formed therein the side wall of which is spaced inwardly of the outer wall of the pot and provided with a suitable electric heating means, generally designated 13. This heating means, as is well known in the art, may comprise a strip of insulating material 14, such as mica or the like, upon which is wound one or more resistance wires adapted to produce heat when connected to a source of electrical energy. This heating element also preferably includes insulating strips 15 and 16 disposed on either side of the central portion of the heater and secured in place by a band 17 which may be provided with spaced ears, such as 18, drawn together by bolts or the like 19. The bottom portion of the pot 10 is preferably provided with a removable housing 20, secured in place as hereinafter described, and which housing serves to cover the heating element and the control means, also hereinafter described.

In addition to the lower vessel or pot, the coffee maker also comprises an upper vessel or bowl 21 which has a hollow tubular portion 22 extending downwardly therefrom and adapted to be inserted through the opening in the pot 10. A sealing means 23, such as a rubber gasket or the like, is provided either around a portion of the bowl 21, as shown, or about the tubular extension 22 to provide a sealing engagement of the bowl with the pot. Within the bowl is provided a filter element 24, herein disclosed as a cloth membrane, supported upon a perforate metallic member 25 and held in place over the opening in the tubular portion 22 by any suitable means. In the illustrated form this holding means comprises a rod 26 extending through the tubular portion 22 with the lower end bent to provide a hook 27 engaging about the lower end of the tubular portion 22. This rod 26 is provided with a washer 28 between which and a second washer 29 is disposed a compression spring 30, the upward movement of the washer 29 being limited by burrs or projections 31 upon the rod. The outer end of the rod 26 has a knob 32 for effecting operation of the rod. It will be readily apparent that, by pressing downwardly upon the knob 32 and moving the rod 26, the hook 27 may be disengaged from the end of the tube 22 and withdrawn therefrom thus permitting removal of the filter 24. A new filter may be replaced by reverse operation and when the hook portion 27 has engaged the tube 22, release of the knob 32 allows the spring 30 to move the rod 26 outwardly sufficiently to firmly secure the filter 24 in place. The top of the upper vessel or bowl 21 is closed by a removable cover such as 33 which may be of conventional construction.

The apparatus as thus far described is substantially conventional and operates in a well-known manner which may be briefly summarized by stating that ground coffee beans are placed in the upper vessel or bowl 21, water is placed in the lower vessel or pot 10, and the apparatus is assembled as shown in Fig. 1. The heating means 13 is then energized and when the water has been heated sufficiently to generate a substantial vapor pressure, i. e. to the boiling point of the water, the water is forced by this vapor pressure from the lower vessel or pot through the tube 22 and thence through the filter 24 and ground coffee into the bowl 21 where it remains for the brewing period. Upon transfer of the liquid in this manner, the heating means is deenergized so that the pot 10 gradually cools and when the vapor pressure therein has been reduced below that necessary to maintain the liquid in the bowl 21, the latter returns through the tube 22 in the form of brewed coffee.

In order to accurately control the termination of the heating period for the water, sometimes referred to as the high heating period and which is productive of the vapor pressure or steam for effecting transfer of the water to the upper vessel or bowl, this invention provides a means responsive to vapor pressure in the lower vessel or pot for governing the said operation of the heating means. In the present preferred construction, this is effected by forming at least a portion of the bottom of the pot 10 in a manner to provide a deflectible or deformable portion. In the form shown, this is accomplished by providing a metal member or diaphragm 34 having a plurality of concentric ribs or raised portions therein and a central flat portion. This flexible member or diaphragm 34 is suitably secured in place to form a watertight bottom for the pot, the securing being effected in any well-known manner as, for example, by welding, brazing or bolting the diaphragm intermediate an integral annular flange 35 at the bottom of the well 12 and an annular flange 36 of the mounting ring 37. The resiliency of this deformable member or diaphragm 34 is such that it does not ordinarily deflect appreciably under the load of the water placed in the pot, within the capacity of the latter, nor under the impact of water flowing therein from the usual faucet. However, the diaphragm 34 is sufficiently flexible to deflect or bow outwardly when the vapor pressure in the pot is sufficient to effect transfer of the liquid through the tube 22 into the bowl 21, this flexing or bowing being utilized to control the operation of the heating means 13 in a manner about to be described.

Supported in spaced relationship below the deformable portion or diaphragm 34 is an electric switch means, generally designated 38, which, in the form shown, is substantially similar to the switch illustrated, described, and claimed in my Patent No. 2,579,389, issued December 18, 1951 and entitled "Thermostatic Switch," to which reference may be made for the details of the construction and principles of operation. This switch means comprises a stationary contact 39 which is rigidly mounted upon a plate 40, the latter, in turn, being supported upon a flange of the mounting ring 37. Suitable insulating means such as mica plates or washers 41 and 42 are provided intermediate the contact 39 and the supporting plate 40, the washer 42 also insulating plate 40 from a terminal member 43 provided upon the contact member or post 39. The movable contact 44 of the switch 38 is mounted upon one end of a resilient contact arm 45, the other end of the latter being supported upon a rigid post 46 which is rigidly mounted upon the supporting plate 40. Insulating washers 47 and 48 are provided on either side of the plate 40, the washer 48 also insulating plate 40 from a terminal member 49 connected with the post 46 in electrical conductive relationship therewith.

Supported upon the resilient contact arm 45, intermediate the contact 44 and the post 46, is a substantially U-shaped bimetallic member 50. This member 50 has the end 51 thereof, adjacent the post 46, hinged to the resilient contact arm as, for example, by providing slots or openings in the arm 45 and passing therethrough tongues or projections of the bimetallic member which are bent over in a manner which will be understood from the aforementioned Patent No. 2,579,389. The other end of the bimetallic member 50 rests freely upon the contact member 45. Intermediate its two ends, the bimetallic member is preferably provided with an insert 52 of insulating material for cooperation with an abutment member, generally designated 53. The construction just described is such that when the abutment member 53 is positioned to engage the insulating member or insert 52, and the temperature of the bimetallic member 50 is elevated, the latter flexes and reacts against the abutment member in a manner such that the free end of the bimetallic member moves in an arc, thereby exerting sufficient pressure on the contact carrying arm 45 to move the contact 44 to circuit opening position with respect to the contact 39.

The above-mentioned abutment member 53 is slidable in a bushing 54 which is, in turn, fixedly mounted in the supporting plate 40. The abutment member includes a sleeve 55 slidable within the bushing 54 and having a collar 56 adjacent its lower end for cooperation with the bushing member 54 to limit the extent of upward movement of the sleeve, this collar being preferably formed as an integral flange on the sleeve member. The bore of the sleeve 55 is preferably threaded and provided with a screw 57 the lower end of which is adapted to engage the insulated portion 52 of the bimetallic member 50.

A movable member or trip stud 58 is disposed above the sleeve 55, in axial alignment therewith, and movable between the latter and the lower surface of the deformable portion or diaphragm 34 of the pot. This stud is adapted to occupy either one of two positions and to be retained in either of those positions until a force is applied thereto. This action is obtained by having the lower end of the stud 58 secured to the center of a plate spring 59, the latter being formed as a dished disk with the edges thereof loosely supported in grooves provided in posts or screws 60 which are disposed around the periphery of the plate spring 59 and have their lower ends supported upon the plate 40, see Figs. 1, 2 and 5. The upper end of the stud 58 is preferably rounded, as shown, and below this rounded portion the shank of the stud is of reduced diameter, an integral flange portion being provided adjacent the plate spring 59 and a collar 58a being secured to the stud below the spring 59 to retain the former on the latter. This reduced diameter shank portion of the stud 58 is freely straddled by the bifurcated outer end of a member 61 forming part of a reset means generally designated 62.

The reset means 62 further comprises a bent lever 63 having a portion extending through an opening in plate 40 and pivoted, by means of a bolt 64, or the like to a bracket 65 provided upon the plate 40. The portion of the lever 63 above the plate 40 has a substantially T-shape, as seen in Figs. 1 and 2, and a bowed plate spring 66 is interposed between the head of this T-shaped portion and the plate 40 to maintain the lever 63 in its neutral position while permitting movement thereof in either direction therefrom. The previously mentioned member 61, which has one end straddling the stud 58, is connected with the head of the T-shaped portion of lever 63 by deformable projections on the latter or by any other suitable means. The outer end of the lever 63 extends through the housing 20 and this outer end is preferably provided with an actuating knob or handle 63a which is shown as a separate member connected to the lever but may be an integral flange on the latter if desired.

It will be apparent that by operation of the lever 63 in one direction the member 61 will act upon the shoulder of the stud 58 deflecting the spring 59 downwardly to engage the lower end of the stud 58 with the sleeve 55, while movement of the lever 63 in the opposite direction will cause the member 61 to engage with the head of the stud 58 forcing the spring 59 to its other position, as shown in Fig. 1, so that the head of the stud 58 is adjacent the lower portion of the deformable bottom or diaphragm 34 of the pot. The spring 59 retains the stud 58 in either of the positions to which it is actuated until force is applied thereto whereupon the spring and stud move with a snap action to the other position thereof.

The pot 10 may be provided with suitable feet, such as 67, which are preferably mounted upon a closure plate 68 for the housing 20 enclosing the control mechanism, said plate and feet being held in position by a screw 69 engaging a mounting strap 70 supported on the mounting ring 37 in any suitable manner.

The terminal members 43 and 49 of the switch 38 are connected in series with the heating means 13 and with a source of electrical energy by connecting wires such as 71 and 72, see Figs. 3 and 4, which are provided with the usual pin type terminals 73 for connection with a conventional plug, not shown, so that the pot may be utilized with a conventional appliance cord and plug.

In operating a coffee maker as thus constructed, ground coffee is placed in the bowl 21 and water in the pot 10 as mentioned heretofore, at which time the control mechanism will be in the position as shown in Fig. 1, the abutment member or trip stud 58 being moved to this position, in the event it was not previously in that position, by momentarily depressing the lever 63. Upon the application of electrical energy to the terminal members 73 the heating element 13 will be energized to rapidly heat the pot until the water therein boils. When the vapor pressure of the water generated by this boiling reaches a predetermined value, it will force a substantial part of the water from the pot 10 to the bowl 21 through the tube 22, filter 24, and coffee resting thereon, this transfer of liquid being terminated when the lower end of the tube 22 is exposed.

The vapor pressure which effects this transfer of the liquid will also have bowed or deflected the deformable portion 34 of the pot bottom outwardly to the position as shown in Fig. 2, thus engaging the stud 58 and moving the latter against the force of the spring 59 to the position as shown in Fig. 2. Hence, the lower end of the stud 58 abuts the movable sleeve 55 thereby moving the screw 57 into engagement with the insulating portion or member 52 on the bimetallic member 50. Since the pot has become hot during this high heat period, the bimetallic member 50 will also have been curved or bent in response to this heat and hence the engagement of the screw 57 with the portion 52 on the bimetallic member exerts force therethrough so that the free end of said bimetallic member moves the contact 44 to circuit opening position with respect to the contact 39, thus deenergizing the heating element 13, this action occurring during the time that the liquid is being transferred from the pot to the bowl and before that transfer is completed.

In order to more closely regulate the operation of the device, the period during which liquid is transferred from the lower to the upper vessel is shortened by providing a small opening 74 in the tube 22 above the normal level of the water in the pot. The purpose of this opening is to relieve vapor pressures which are less than those developed by boiling of the liquid, the size of the opening, however, being too small to materially relieve the vapor pressure when the latter is rapidly generated, as, for example, by boiling of the liquid. Consequently, there is substantially no transfer of liquid between the vessels until boiling occurs, whereupon the transfer is rapidly effected. Since it is the vapor pressure, causing the transfer of the liquid, that is effective to engage the abutment means with the thermostatic member and thereby operate the switch, the heating means is jointly controlled by both vapor pressure and the temperature of the pot. It should be noted, however, that the deflection of the bimetallic member 50 corresponding to the temperature of the pot when the water boils is insufficient to operate switch 38 until the screw 57 has engaged the said bimetallic member. Hence, variations in the temperature of the pot at the time of liquid transfer are ineffective to vary the operation of the device. Consequently, the termination of the high heating period is accurately controlled so as to always occur when the liquid is transferred from the lower vessel to the upper vessel.

The heating means or element 13 remains deenergized during the time that the liquid is in the upper vessel or bowl, thus allowing the pot to cool thereby reducing the vapor pressure therein so that the liquid returns through the tube 22 into the pot in the form of brewed coffee. The brewing period, namely the time interval during which the liquid is in the bowl is therefore accurately controlled within very close limits so that a consistently delicious coffee is produced without attention from the operator and regardless of variations in the initial temperature of the water employed, fluctuations in the supply of electrical energy, and the like.

When the vapor pressure in the pot has been reduced, as above stated, allowing the brewed coffee to return to the pot, the deflectable portion or diaphragm 34 returns to its initial position as shown in Fig. 1. The stud 58, the sleeve 55 and screw 57, however, remain in their actuated positions, being held therein by the plate spring 59 which has reversed its direction of curvature by having snapped through a neutral position when the bowing of the pot bottom actuated stud 58. Consequently, the screw 57 remains in abutting relationship with the bimetallic member 50 intermediate the ends of the latter so that the operation of the switch 38 is now under control of the bimetallic member, thereby providing for control of the heating element 13 at a lower temperature to maintain the brewed coffee at a substantially uniform serving temperature. That is to say, when the coffee in the pot drops in temperature below the predetermined serving temperature, the bimetallic member 50 will have straightened sufficiently to allow the contacts 39 and 44 to reengage, thus closing the circuit to the electrical heater 13, reenergizing the latter. However, since the screw 57 remains in abutting relationship with the bimetallic member, the temperature to which the pot and coffee therein is now heated cannot rise to the boiling point of the coffee since the elevation in the temperature of the latter to the serving temperature results in sufficient deflection of the bimetallic member to again open the switch 38 due to the fact that upward movement of the bimetallic member is limited by screw 57. Therefore, the pot may be left connected to the source of electrical energy and will continue to maintain the brewed coffee at serving temperature indefinitely by repeated operation of the bimetallic member 50.

When it is desired to brew a new quantity of coffee, a fresh quantity of water and coffee is provided in the pot and bowl respectively, as above described, the lever 63 is depressed, thus causing the member 61 to engage under the head of the stud 58 thereby snapping the latter and the plate spring 59 to the upper positions thereof as shown in Fig. 1 so that the coffee maker is again ready for operation as just described.

In the event coffee has been brewed and it is not desired to use it immediately, the coffee maker is disconnected from the source of electrical energy and the coffee is allowed to cool. When it is later desired to serve the coffee, it is not necessary to brew a new quantity nor to have the coffee go through the brewing cycle again in order to heat the latter to the desired serving temperature. Moreover, this heating to the desired temperature may be effected even though the control mechanism had been intentionally or inadvertently reset to the position shown in Fig. 1, the coffee maker being reconditioned for heating the coffee to the desired serving temperature by simply lifting upward momentarily on the lever 63. This causes the member 61 to depress the stud 58 and plate spring 59 to thereby bring the sleeve 55 and screw 57 into abutting relationship with the bimetallic member 50, whereupon the heating element of the coffee maker will recycle through the lower temperature to properly condition the coffee for serving. The coffee maker may be reconditioned for brewing a fresh quantity of coffee as above described.

As mentioned heretofore, the deflection of the bimetallic element 50, upon heating of the pot to a temperature sufficient to maintain the coffee at a serving temperature, will actuate the switch 38 if the screw 57 be in abutting relationship with the bimetallic member. However, the deflection of the bimetallic member 50 is insufficient to open the switch upon initial heating of the pot to the boiling temperature unless the screw 57 is moved into abutting relationship therewith by deformation of the bottom of the pot. Nevertheless, the deflection of the bimetallic member 50 can become sufficient to open the switch 38 even in the absence of operation of the stud 58 and screw 57 if the temperature of the pot becomes higher than necessary for effecting boiling of water. This position of the parts is illustrated diagrammatically in Fig. 4 and provides a safety feature preventing burning out of the pot in the event it should be connected for high heat operation with no water in the pot.

Figure 7:
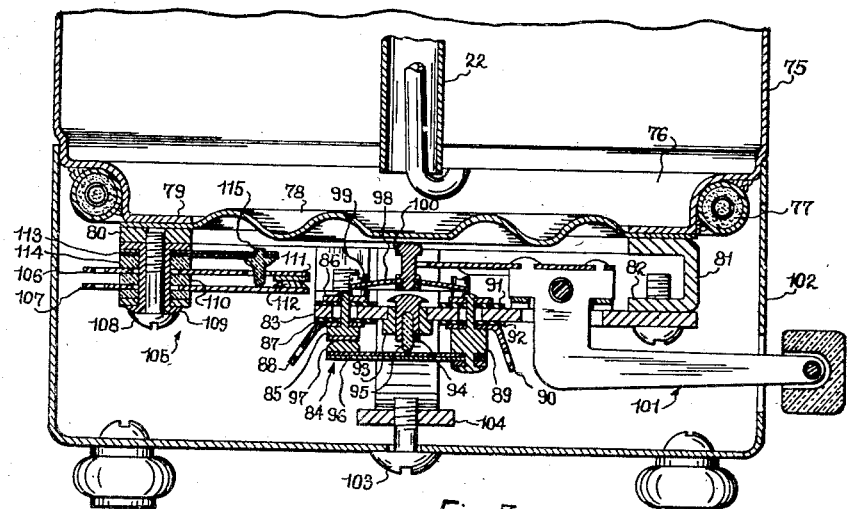
Fig. 7 is a vertical sectional view through the lower portion of a coffee maker embodying a first modification of this invention.

A modified form of the invention is illustrated in Fig. 7. In this form of the device the lower vessel or pot 75 may have the same type of well and heater as shown in Fig. 1, but in the illustrated form is shown as having a shallower well 76, the outer wall of which is provided with a tubular heating element 77 of conventional construction. The bottom of the pot 75 is made flexible or deformable in a similar manner to that shown in Fig. 1, as, for example, by welding, brazing or bolting a metallic diaphragm, or the like, 78 between an inturned flange 79 of the pot and an annular member 80. The member 80 preferably has spaced supporting portions or members 81, secured thereto or integral therewith, having inwardly directed flange portions such as 82 spaced from the bottom of the pot. Secured to these inwardly directed flange portions 82 is a mounting or supporting plate 83 corresponding in function to the plate 40 in Fig. 1. Supported upon the plate 83, so as to be substantially centrally disposed with respect to the deflectible portion or diaphragm 78, is an electrical switch, generally designated 84. This switch comprises a stationary contact 85 provided with insulating washers 86, 87 and terminal member 88, and is mounted upon the supporting plate 83 in the same manner as the similar parts of switch 38 in Fig. 1. The switch 84 likewise comprises a stationary mounting post 89 mounted upon the plate 83 in the same manner as the post 46 of switch 38, which post is provided with a terminal member 90 and is insulated from the plate 83 by insulating washers 91 and 92.

Intermediate the contact member 85 and the post 89, and substantially centrally of the bottom of the pot, the plate 83 is provided with a central opening in which is disposed a bushing 93. Slidably mounted within the central opening of the bushing 93 is a headed pin 94, the lower end of which is preferably provided with an insulating portion or insert 95 which engages a resilient contact arm 96 of the switch intermediate the ends of the arm. The contact arm 96 is provided with the movable contact 97 adjacent one end, the other end being supported upon the post 89, as by means of a reduced diameter portion of the latter passing through an opening in the contact arm with the outer end of the post peened over. As illustrated, the contact arm 96 is preferably bimetallic and, while the resiliency of the member is such as to normally hold the contacts engaged, the metals of the bimetallic member are so arranged that a temperature of the pot in excess of that necessary to boil water therein will cause the arm to bend or deflect in circuit opening direction to thereby protect the coffee maker if inadvertently operated in a dry condition.

Disposed above plate 83 is a spring member 98 of the dished disk variety similar to the spring 59 shown in Figs. 1, 2 and 5 and mounted in a similar manner by posts 99. Centrally of the spring 98 is mounted an abutment pin or trip stud member 100 similar to the stud 58 and operating in the same manner. Likewise, the control mechanism is provided with a reset means, generally designated 101, and corresponding to the reset means 62 of Figs. 1 and 2. The operation and construction of this reset means is the same as previously described for the corresponding mechanism of the preferred embodiment and hence need not be redescribed. The control mechanism shown in Fig. 7 is enclosed by a suitable housing 102 which is secured in place by one or more screws 103 cooperating with a bracket or bracket members 104 in a conventional manner which may be similar to the way in which the housing 20 is secured in place in the preferred form of the apparatus.

The bowl or upper vessel of the coffee maker may be the same as that shown in Figs. 1 and 2 and hence is not here illustrated or described in detail, it being sufficient to note that the tube 22 thereof projects downwardly adjacent the flexible bottom or diaphragm 78 in the same manner as in the preferred form of the apparatus.

Mounted upon the supporting member or ring 80, in good thermal exchange relationship therewith and hence with the bottom of the pot, is a thermally responsive switch, generally designated 105. This switch may be of any conventional construction but is here shown as comprising a pair of contact arms 106 and 107 mounted in spaced relationship upon a common stud 108 which passes through a mounting sleeve 109 and is secured to the annular member or ring 80. The contact arms 106, 107 are separated from each other by an insulating washer 110 and their outer ends are provided with cooperating contacts 111 and 112 normally in engagement under the tension exerted by the resiliency of arm 107. A bimetallic strip 113 is also mounted upon the sleeve 109 in thermal conductive relationship with the bottom of the pot, through the ring 80, and spaced and insulated from the contact arm 106 by an insulating washer 114. A similar insulating washer is provided between contact arm 107 and a metallic washer adjacent the enlarged outer end of the mounting sleeve 109.

The bimetallic member 113 is adapted to flex downwardly, as viewed in the drawings, when heated, and the outer end thereof is provided with an insulating stud or projection 115 which extends freely through an opening in the contact arm 106 with the lower end of the stud 115 bearing upon the resilient contact arm 107. The bimetallic strip or member 113 is so calibrated that when the liquid within the pot 75 reaches a temperature corresponding with that at which it is desired to serve the coffee, the bimetallic member deflects sufficiently to separate the contact 112 from the contact 111, it being remembered that the contact arm 107 is more flexible than the arm 106, the latter being relatively rigid and only sufficiently flexible for adjusting purposes.

Figure 9:
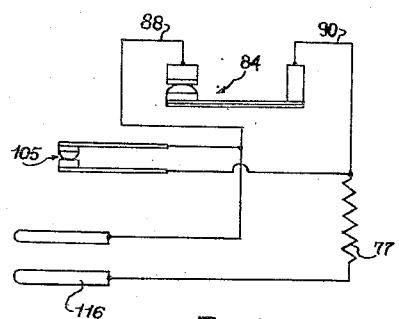

The manner in which the two electrical switches 84 and 105, just described, are connected to the heating element 77 is illustrated in Fig. 9 from which it will be seen that the pin type terminal members, such as 116, for connecting the coffee maker to an appliance cord, are connected in series with the heating element 77 through the switch 84 with the switch 105 being connected in parallel about the switch 84 and hence also in series with the heater of the coffee maker. Therefore, the heating element 77 cannot be deenergized unless both switches are open at the same time.

As in operation of the preferred form of the apparatus, the instant form of the device is prepared for operation by placing water in the pot 75 and ground coffee in the upper vessel or bowl, the control mechanism being in the position shown in Fig. 7. With the terminals 116 of the pot connected to a source of electrical energy, electrical current is supplied through the closed switch 84 energizing the heating element 77. A parallel circuit is also provided for the heating element through the switch 105. When the temperature of the water in the pot reaches that at which coffee is normally served, switch 105 opens. This does not, however, terminate the heating, since the circuit to the heating element 77 remains closed through the switch 84. Heating of the liquid in the pot therefore continues until the latter boils and develops sufficient vapor pressure to effect transfer of the water to the upper bowl through the tube 22 whereupon the vapor pressure deflects the flexible diaphragm or bottom wall 78, thereby moving the stud 100 downwardly, snap action being imparted thereto by the spring 98 as the latter moves through center. Consequently, the pin 94 is engaged and moved downwardly thereby forcing the resilient contact arm 96 to circuit opening position, thus terminating the high heat period by deenergizing the heater 77. Since the plate spring 98 remains in the position to which it has been actuated, namely curved in reverse direction from that shown in Fig. 7, the switch 84 will remain open after the brewed coffee returns to the pot 75 although the reduction in vapor pressure therein has caused the bottom 78 to return to its initial position. Therefore, the heating element 77 cannot be reenergized through switch 84 to again boil the liquid.

As the temperature of the liquid in the pot 75 drops below the desired serving temperature, the bimetallic member 113 will tend to straighten, thereby closing the contacts 111, 112 of switch 105 so that the heating element 77 is again energized through this switch to thereby heat the liquid in the pot. When the temperature of the liquid now reaches a predetermined serving temperature, the bimetallic member 113 again deflects sufficiently to open the switch 105 so that the liquid is not heated to its boiling point. This operation is repeated maintaining the coffee at the desired temperature until the coffee maker is disconnected.

A new cycle of coffee making may be reinstituted by operating the reset mechanism 101, as in the manner described with respect to the preferred embodiment, which will then snap the spring member 98 back to its initial position, allowing the contact arm 96 to return to circuit closing position with the abutment member or stud 100 adjacent the deformable bottom 78 of the pot for a new actuation thereby when the liquid in the pot boils and generates the necessary vapor pressure. Likewise, this form of the invention may be utilized to maintain the temperature of the brewed coffee at a predetermined serving temperature without reboiling the liquid in the pot, after the latter has become cold, by simply operating the reset mechanism to dispose the pin 94 in position opening the switch 84 and then connecting the pot to a sorucе of electrical energy, the heating of the coffee then being under control of the switch 105 as above described.

As mentioned above, the contact arm 96 is preferably bimetallic. This is for the purpose of preventing damage to the coffee maker if the latter be set for high heat, i. e., as shown in Fig. 7 and connected to a source of electrical energy with no water in the pot. In such a case, when the temperature of the pot exceeds that necessary to boil water, the arm 96 will have deflected sufficiently to open switch 84. Prior to this time the switch 105 will also have opened since it is operated at a lower temperature. It is apparent, however, that if this safety feature is not desired, the arm 96 may be formed of but a single metal and the normal operation of the coffee maker would be the same as heretofore described.

Figure 8:
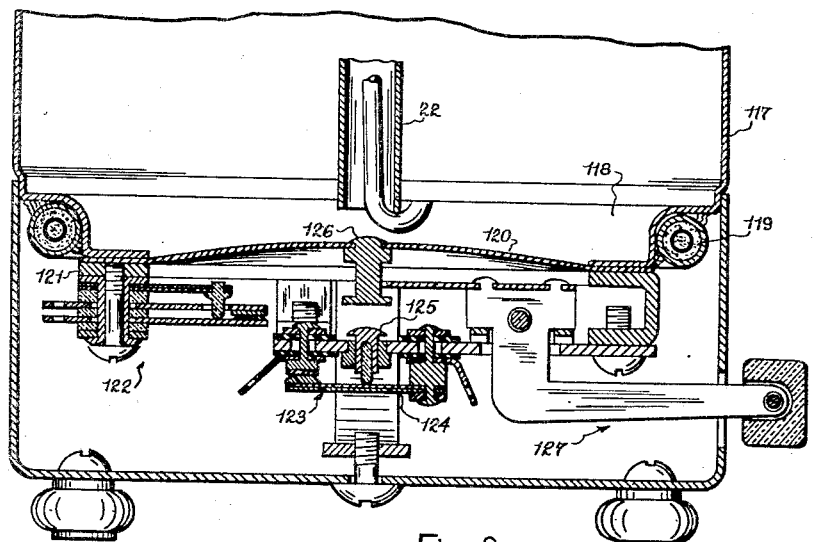
Fig. 8 is a vertical sectional view of the lower portion of a coffee maker embodying another modification of the invention; and, Fig. 9 is a schematic diagram illustrating the wiring for the modifications shown in Figs. 7 and 8.

A further modification of a coffee maker constructed in accordance with this invention is illustrated in Fig. 8. In this form of the device, the pot 117 is provided with a well 118 and tubular heater 119 similar to the corresponding parts designated 75, 76 and 77 in Fig. 7. In this form of the device, however, the deformable portion of the pot may comprise a snap-acting metallic disk 120 instead of the corrugated member 78 shown in Fig. 7. The instant form of resilient member is therefore similar in operation to the springs 59 and 98 of the forms of the device shown in Figs. 1 and 7 with the result that a separate spring member of this type need not be employed, the deformable bottom 120 operating both as the bottom of the pot and as the spring means of the mechanism. The member 120 forming the bottom of the pot may be secured in place between a suitable retaining ring 121 and an inturned flange of the pot by any suitable means such as welding, brazing, or bolting.

The control mechanism may comprise a thermally responsive switch 122 identical in construction and operation with the switch 105 of Fig. 7. Likewise, the control mechanism in Fig. 8 includes a switch mechanism 123 similar in construction to that designated 84 in Fig. 7. Also, the movable arm 124 of switch 123 is engaged by a pin 125, similar to the pin 94, and movably supported by the mounting plate for the switch. However, as noted above, a separate spring such as 98 is not employed and hence the actuating member or trip stud 126, corresponding with the stud 100 of Fig. 7, is directly connected to the flexible bottom 120 of the pot. Consequently, when the vapor pressure in the pot 117 reaches the predetermined value effective to transfer the liquid to the upper vessel or bowl, the bottom 120 of the pot snaps outwardly moving the member 126 into engagement with the pin 125 thus opening the switch 123 deenergizing the heating means 119.

As mentioned above, the bottom 120 of the pot is a flexible plate of the snap-acting type and, like the springs 59 and 98, remains in the position to which it is actuated until a positive force is applied thereto. Consequently, the switch 123 will remain open until positively reset and therefore the brewed coffee, after return to the pot, is maintained at a predetermined temperature within the pot by operation of the thermally responsive switch 122 in the same manner as described above for the operation of the switch 105 in conjunction with the embodiment illustrated in Fig. 7. Likewise, the switch 123 has the resilient contact arm 124 thereof formed of bimetallic material so that this switch will open in response to heating of the pot to a temperature above that necessary to boil the liquid in the pot even though the flexible bottom 120 be in its undeflected position, shown in Fig. 8, thereby preventing damage to the coffee maker in the event the latter be operated with no liquid therein.

Since, as noted above, a separate spring is not provided in this form of the device, the reset mechanism 127, which is identical with the reset mechanism 101, operates upon the stud 126 to reset the flexible bottom 120 in a manner identical with the resetting of the spring means 98 or the spring means 59. In view of the close similarity between the form of the device shown in Fig. 8 and that shown in Fig. 7, it is believed that further description of the construction or operation thereof is not necessary.

Tests conducted upon coffee makers constructed in accordance with the disclosure of this invention have shown a remarkably close correlation between the time of the opening of the circuit to the heating element and the time the transfer of liquid to the upper vessel or bowl is completed. Moreover, this correlation is not appreciably altered whether the quantity of liquid employed is that sufficient for one or a plurality of cups of coffee, whether the water be cold or hot when placed in the pot, or whether or not the voltage of the electrical energy fluctuates during the operation. In all tests, even under the variable conditions mentioned, the interval from the time that the water starts up into the upper vessel or bowl to the time when the current was cut off was of very short duration and substantially constant. Furthermore, in all cases the current was completely off before all the water reached the upper bowl or vessel, thus indicating the exactitude of the control. These operations are in contrast to those of coffee makers employing thermally responsive means for terminating the high heat period. In such conventional devices, variations in the initial temperature of the water has an appreciable effect upon the time between which substantially all of the water is transferred to the upper vessel and the heating element is deenergized. Likewise, fluctuations in voltage of the electrical current supply has been found to have a very appreciable effect upon operation of such conventional coffee makers, causing quite erratic operation thereof.

While a preferred form of the invention and several modifications thereof have been illustrated and described in considerable detail, it is to be understood that this is only by way of illustration of the manner in which the invention may be practiced and that, as noted above, the invention is not limited to use with coffee makers but may be employed wherever similar problems are encountered. Furthermore, various constructional features of the coffee makers illustrated may be altered without departing from the essence of this invention. For example, the lower vessels or pots shown in Figs. 7 and 8 may be constructed with a relatively deep well and provided with a heating means of the type shown in Fig. 1, or conversely. Likewise, the resetting means need not take the exact form shown in the drawings. In addition, it will be apparent that in inexpensive constructions, the feature of maintaining the brewed coffee at a predetermined temperature may be omitted by omitting the switches such as 105, 122 of Figs. 7 and 8 and the bimetallic member 50 of Fig. 1. In the latter instance, the screw 56 would be of sufficient length to directly contact the resilient arm 45. Moreover, while adjustment of the serving temperature of the coffee may be effected in the form of the device shown in Fig. 1 by adjustment of the screw 57, and in the forms of the device shown in Figs. 7 and 8 by bending the contact arm such as 106, it will be apparent that other means of adjusting this temperature may be provided.

Other modifications and variations in construction and embodiments of the invention will be readily suggested to those skilled in the art after having had the advantage of this disclosure and therefore the invention is not to be considered as limited to the exact details shown and described.

Having thus described the invention, I claim:

1. An apparatus of the character described comprising a first vessel provided with an opening adjacent the top, the said vessel being adapted to contain a liquid to be heated, an electrical heater for said vessel, a second vessel, a hollow tubular member connected with said second vessel and adapted to extend into said first vessel through the opening thereof in sealing relationship and with an opening of said tubular member adjacent the bottom of said first vessel, an electrical switch connected in series with said heater, thermoresponsive means movable in response to changes of temperature of said first vessel and having a portion positioned to effect operation of said switch means, and pressure responsive means movable in response to generation of a predetermined vapor pressure in said first vessel as a result of heating the liquid therein and including a portion positioned to contact said thermoresponsive means and operate through the latter to thereby actuate said switch means, whereby the operation of said heating means is governed by a single switch under the joint control of said pressure responsive means and said thermoresponsive means.

2. An apparatus as defined in claim 1 wherein the said thermal responsive means is a bimetallic member positioned intermediate said pressure responsive means and said switch means, the said pressure responsive means includes a movable member adapted to engage said bimetallic member intermediate its ends, means cooperating with said movable member to retain it in the position to which it is moved by generation of said predetermined vapor pressure so that said switch means is thereafter operated solely by flexing of said bimetallic member in response to changes in temperature of said first vessel, and manually operatable means cooperating with said movable member to return the latter to its initial position.

3. An apparatus of the character described comprising a first vessel provided with an opening adjacent the top thereof, the said vessel being adapted to receive a liquid to be heated with a portion of the wall of said vessel being deformable in response to generation of a predetermined vapor pressure within the vessel, an electric heating means for the liquid in said vessel, a second vessel, a hollow tubular member communicating with said second vessel and adapted to extend into said first vessel through the opening thereof in sealing relationship and with an opening of said tubular member adjacent the bottom of said first vessel, a member moved by deflection of the said deformable wall portion of said first vessel, a bimetallic member mounted adjacent said first vessel for movement in response to changes in temperature thereof, the said bimetallic member being positioned for engagement intermediate its ends by said movable member, and an electrical switch connected to said heating means for controlling the operation thereof, the said electrical switch including a movable contact positioned for movement by said bimetallic member upon movement of the latter, whereby the operation of said switch is jointly controlled by the vapor pressure in said first vessel and by the temperature of the latter.

4. A coffee maker comprising a heating pot adapted to receive a liquid and having a portion of the wall deformable in response to generation of a predetermined vapor pressure therein, a bowl adapted to seat upon said pot in sealing relationship, a tube providing communication between said pot and bowl for movement of the liquid therebetween, an electric heating element mounted on the pot, an electric switch means connected in series with said heating element for controlling the operation of said element, the said switch means including a contact operating arm normally biased to circuit closing position and spaced from the said deformable wall portion of said pot, a bimetallic member mounted for movement in response to changes in temperature of said pot and having a portion adapted to engage and move said contact arm, and means supported for movement intermediate said deformable wall portion and said bimetallic member, the last-mentioned means being movable by deflection of said deformable wall portion in response to generation of a predetermined vapor pressure in said pot sufficient to effect transfer of a substantial portion of the liquid from said pot to said bowl to engage said bimetallic member intermediate the ends of the latter, whereupon the said bimetallic member deflected in response to the elevated temperature of said pot operates said contact arm to circuit opening position.

5. A coffee maker of the type defined in claim 4 and further comprising means cooperating with a portion of the said movable means to retain said means in the position to which it is moved by said deformable portion of said pot after the said deformable portion has returned to its initial position, whereby the said bimetallic member is thereafter effective to operate said contact arm in response to temperatures of said pot lower than that productive of said predetermined vapor pressure thereby maintaining the brewed coffee at a substantially uniform serving temperature, and manually operatable means cooperating with said movable means to return the latter to its initial position.

6. A coffee maker comprising a heating pot adapted to receive a liquid with a portion of the bottom of said pot being adapted to flex outwardly in response to generation of a predetermined vapor pressure in said pot, a bowl adapted to seat upon said pot in sealing relationship, a tube providing communication between said pot and bowl for movement of the liquid therebetween, an electric heating element mounted on said pot, electric switch means connected in series with said heating element, the said switch means including a contact operating arm normally biased to circuit closing position and spaced from the bottom of said pot, a bimetallic member having a portion normally engaging said contact arm, a member guided for vertical movement with its lower end resting upon said bimetallic member, spring means mounted intermediate the flexible portion of said pot and said movable member, the said spring means being adapted to move with a snap action from one position to another position thereof and remain in either of said positions until a force is applied thereto, an abutment member carried by said spring means for movement therewith, the said abutment member being disposed in spaced relationship to said vertically movable member and closely adjacent said flexible portion of said pot in one position of said spring means, the said abutment member and spring means being moved to the second position thereof upon deformation of said flexible portion of said pot in response to generation of the said predetermined vapor pressure therein thereby moving said abutment member into engagement with said movable member thereby rendering said bimetallic member operative to effect movement of said contact arm, and manually operatable means cooperating with said abutment member to move the latter and said spring means to either position thereof.

References Cited in the file of this patent

UNITED STATES PATENTS

| Number | Name | Date |
|---|---|---|
| 1,836,520 | Xardell | Dec. 15, 1931 |
| 2,150,801 | Keaton | Mar. 14, 1939 |
| 2,262,286 | Ireland | Nov. 11, 1941 |
| 2,268,633 | Aske | Jan. 6, 1942 |
| 2,269,111 | Jepson et al. | Jan. 6, 1942 |
| 2,287,580 | Wagner | June 23, 1942 |
| 2,312,555 | Jepson | Mar. 2, 1943 |
| 2,365,615 | Woodman | Dec. 19, 1944 |
| 2,369,932 | Allen | Feb. 20, 1945 |
| 2,388,335 | McCullough | Nov. 6, 1945 |
| 2,427,945 | Clark et al. | Sept. 23, 1947 |
| 2,445,591 | Sullivan | July 20, 1948 |
| 2,502,326 | Koonz et al. | Mar. 28, 1950 |
| 2,526,566 | Kolisch | Oct. 17, 1950 |
| 2,537,167 | Snyder | Jan. 9, 1951 |
| 2,577,985 | Willman | Dec. 11, 1951 |

FOREIGN PATENTS

| Number | Country | Date |
|---|---|---|
| 717,909 | France | Oct. 26, 1931 |
| 889,985 | France | Oct. 25, 1943 |